Nov. 8, 1966 R. MALITTE 3,284,134
ADJUSTABLE SEATS
Filed April 30, 1964 6 Sheets-Sheet 1
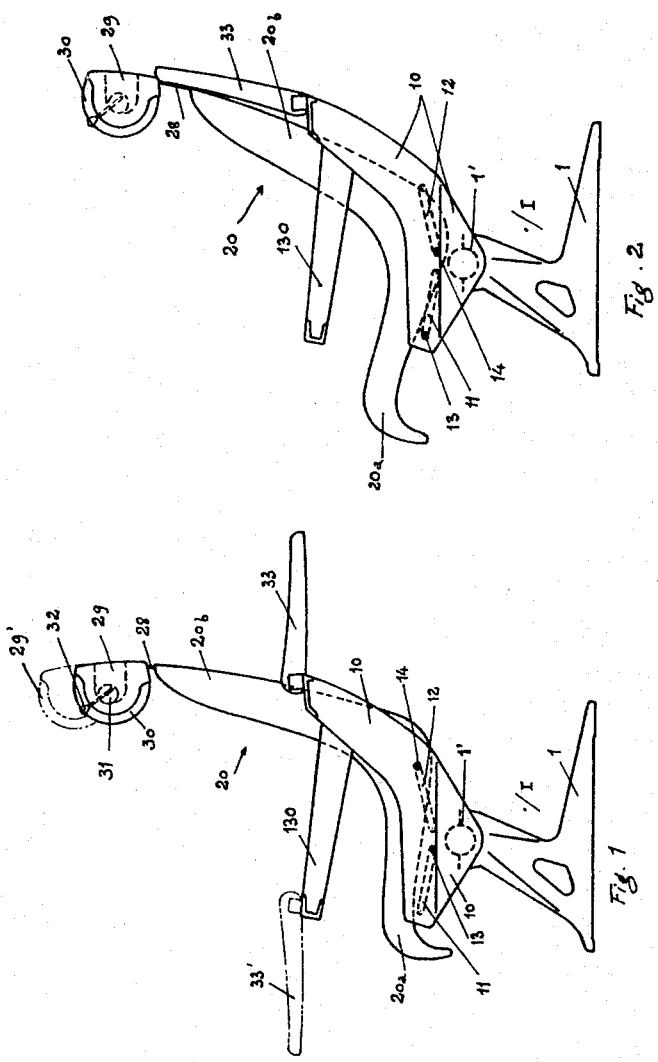
INVENTOR
ROBERT MALITTE
By Young + Thompson
ATTYS Nov. 8, 1966       R. MALITTE       3,284,134
ADJUSTABLE SEATS
Filed April 30, 1964       6 Sheets-Sheet 2
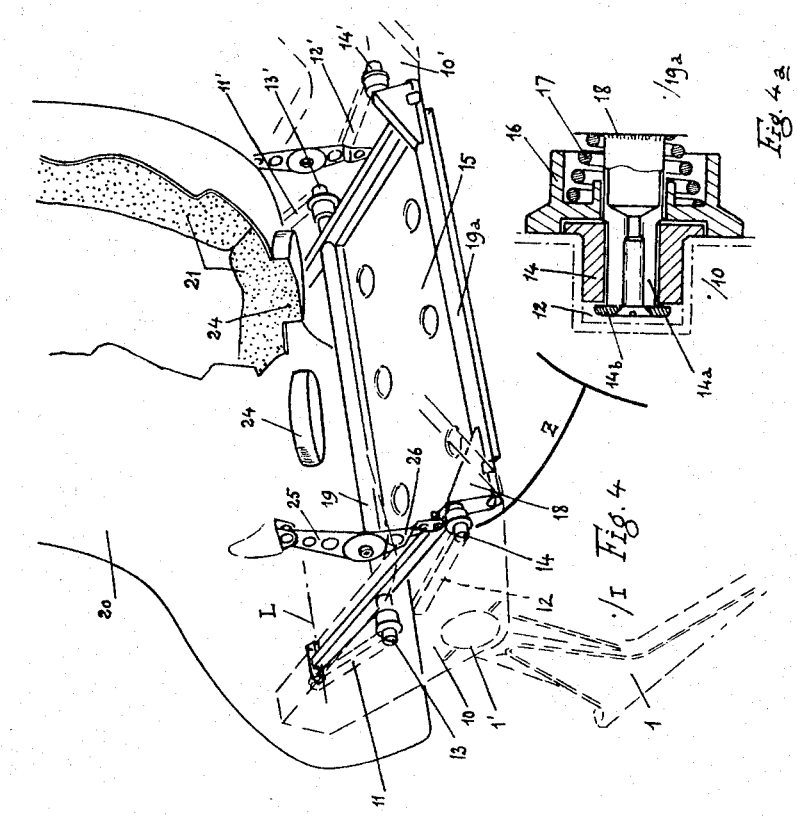
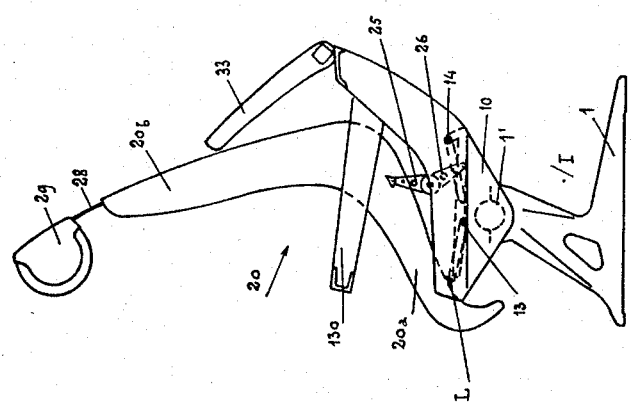
INVENTOR
ROBERT MALITTE
By Young & Thompson
ATTYS Nov. 8, 1966 R. MALITTE 3,284,134
ADJUSTABLE SEATS
Filed April 30, 1964 6 Sheets-Sheet 3
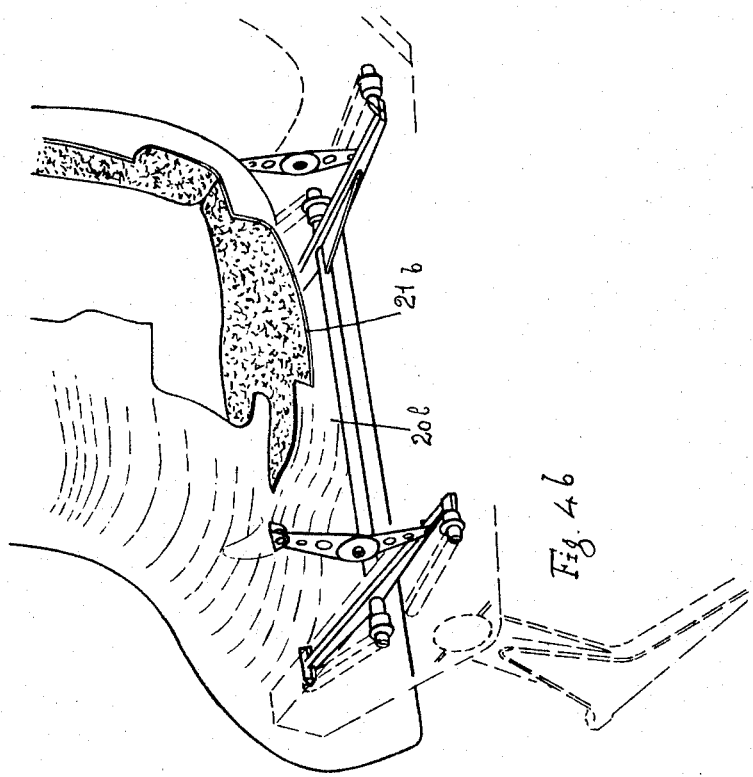
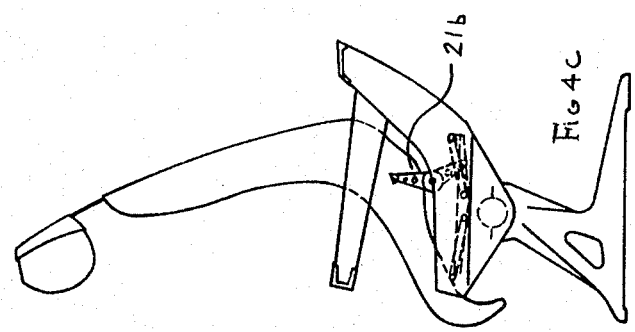
INVENTOR
ROBERT MALITTE
By Young + Thompson
ATTYS

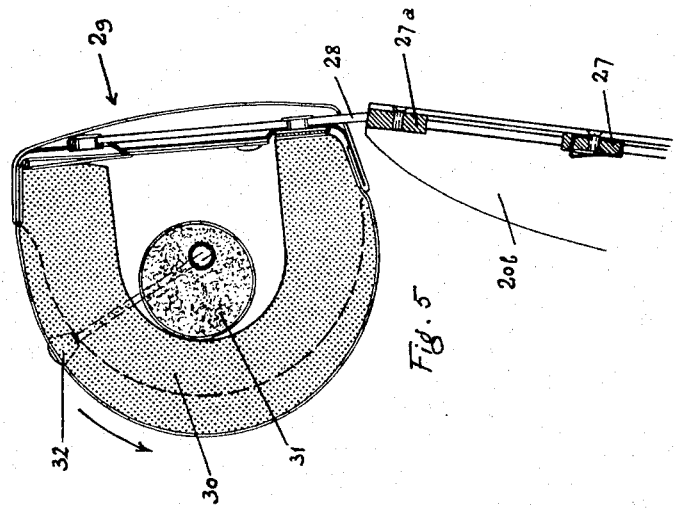
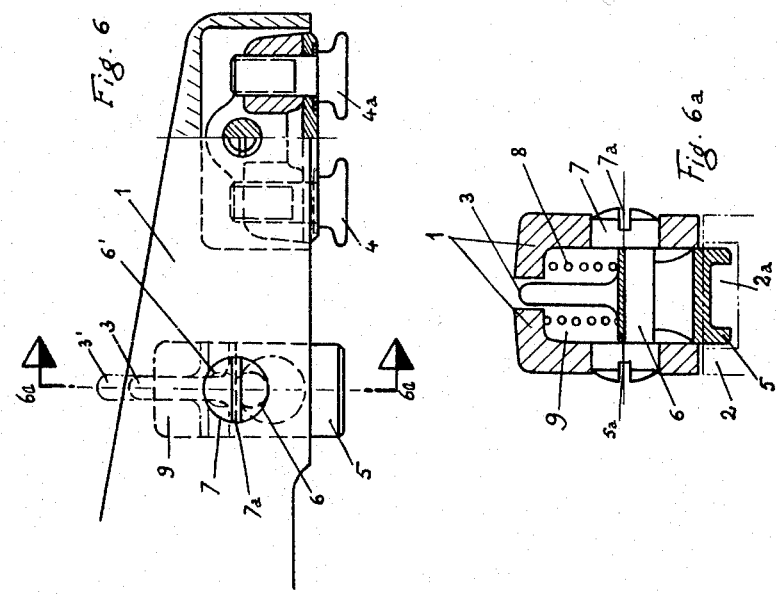

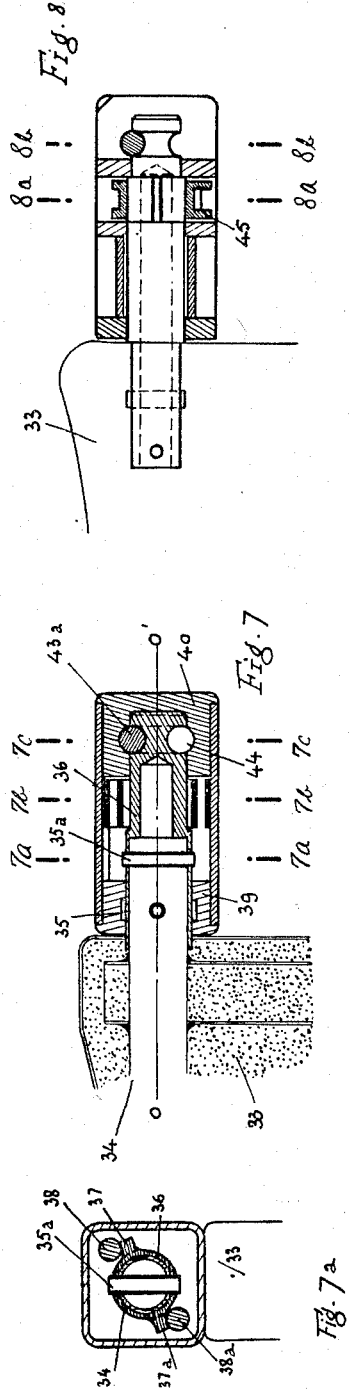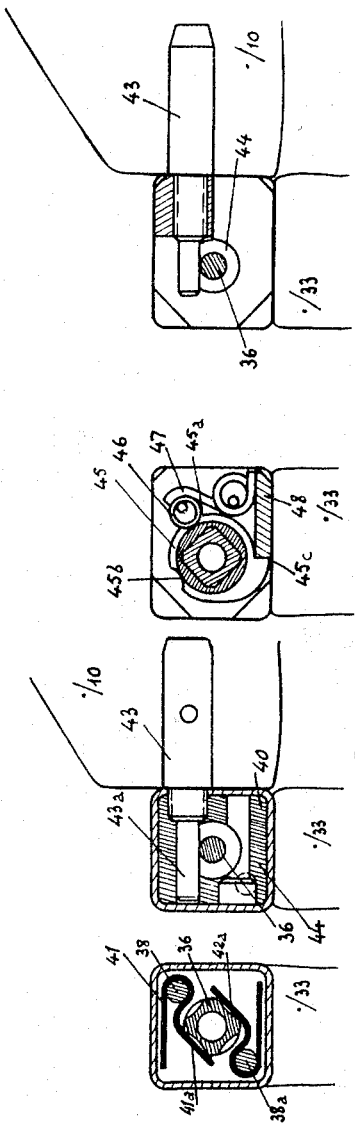

Nov. 8, 1966 R. MALITTE 3,284,134
ADJUSTABLE SEATS
Filed April 30, 1964 6 Sheets-Sheet 6

INVENTOR
ROBERT MALITTE
BY Young & Thompson
ATTYS.

# United States Patent Office 3,284,134
Patented Nov. 8, 1966

3,284,134
ADJUSTABLE SEATS
Robert Malitte, Orly, Seine, France, assignor to Compagnie Nationale Air France, Paris, France, a French company
Filed Apr. 30, 1964, Ser. No. 363,925
3 Claims. (Cl. 297—329)

This invention relates to adjustable seats.

An object of the invention is to provide an adjustable seat specially suited for use in premises or vehicles in which the number of persons to be seated must be as high as possible per unit of surface without impairing the comfort or safety of the occupants, for example seats for halls, amphitheatres, land-vehicles (especially public conveyances), ships of all types, and aircraft.

According to the present invention an adjustable seat comprises a body having a back portion and a seat portion, a support for the body, and an adjustable connection between the body and the support adapted to permit combined downward and forward movement of the back portion simultaneously with combined forward and upward movement of the seat portion.

Preferably the back and seat portions of the body merge in a curve, and the connection between the body and the support is adapted to permit movement of the body about an axis parallel to the axis of mean curvature of the body so that the back portion is tiltable to slope upwards and rearwards without moving towards the next adjacent seat at the rear.

Preferably also the support includes a pair of laterally spaced parallel side frames, and the adjustable connection includes front and rear pairs of bearing rollers mounted on the body under the seat portion thereof and engaging in front and rear pairs of guide slots in the side frames, the rear pair of guide slots being sloped forwards and downwards and the front pair being sloped forwards and upwards, and braking rims co-axial with the guide rollers and spring-urged into frictional engagement with the side frames to hold the body in adjusted position while permitting adjustment thereof by the user.

Preferably also the body consists of a hollow, rigid base moulded as a unit to accommodate the seated figure generally, and a lining of resilient material on the base to accommodate individual differences in figure.

Embodiments of the invention will now be described by way of example with reference to the accompanying drawings in which:

FIG. 1 is a diagrammatic elevation from the left of an adjustable seat showing the body in the upright position and showing two possible positions of the head-rest on the one hand and of the tray on the other hand;

FIG. 2 is a view similar to FIG. 1 but showing the body in the advanced lower position, and showing the tray in stowed position;

FIG. 3 is a view similar to FIG. 1 but showing the body tilted forwards;

FIG. 4 is a bottom perspective rear view, with parts broken away showing the body undercarriage and resilient lining;

FIG. 4a is an enlarged axial section of one of the braking rims;

FIGS. 4b and 4c are respectively rear perspective and end views of an alternative form of resilient lining for the body;

FIG. 5 is an enlarged cross-section of the head-rest;

FIG. 6 is an enlarged longitudinal section of the locking mechanism of a supporting foot on its rail;

FIG. 6a is a cross-section through VIA—VIA of FIG. 6;

FIG. 7 is an axial section of the tray mounting;

FIGS. 7a, 7b and 7c are cross-sections respectively through A, B and C of FIG. 7;

FIG. 8 is an axial section of a second form of tray mounting;

FIGS. 8d and 8e are cross-sections respectively through D and E of FIG. 8;

Figure 9B:
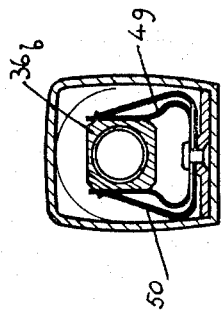
FIGS. 9a, 9b and 9c are cross-sections respectively through A, B and C of FIG. 9.

Referring to the drawings:

The seat body is supported on two identical upright legs terminating in feet 1 (only one of which is visible in the drawing). Each leg and foot is formed as a unit of cast or stamped light alloy, or of strong, drawn metal plate or of welded or brazed tubes, and the rear edge of each unit is of V-shape presenting a deep recess of I which allows the user in the seat immediately behind to stretch out and move his legs without the risk of getting a knock or being caught, as in the case of the vertical or almost vertical feet of the usual seats.

Each foot 1 is locked on a rail 2 which is itself integral with the floor-boards or floor. The locking mechanism with indicator 3 (FIGS. 6 and 6a) locks the foot on the rail in which the retaining heads 4 and 4a slidingly engage. The locking element proper is a vertical bolt 5 which is caused to engage in a hole 2a in the rail 2 by rotation of an eccentric 6 in a horizontal bore 5a in the bolt. The eccentric 6 lowers and raises the bolt 5 which slides in a vertical bore 9, being controlled by a head 7 with a transverse slit 7a into which can be introduced a screw-driver, a key, or simply a coin. The spring 8 which is under compressive stress in the bore 9 returns the indicator end-piece 3 to the interior of the foot, and its disappearance indicates that the foot is locked on its rail; with the bolt 5 in locking position, rotation of the eccentric 6 causes the bolt 5 to disappear into the bore 9 and pushes back (eccentric position 6') the indicator end-piece 3 to position 3' projecting from the foot 1, indicating that the latter is no longer locked.

A pair of parallel side members 10 are fixed at the desired distance apart on a horizontal bearing tube 1' which is itself fixed on the apices of the feet. The members 10 each have two slots 11 and 12 (the corresponding elements at the remote side of the seat have the references 10', 11', and 12' in FIG. 4) and support the standard arm-rests 130 (fixed or liftable). The slots 11, 11' slope forwards and upwards while the slots 12, 12' slope forwards and downwards.

In each of the slots 11 and 12 (or 11' and 12') there can roll respectively bearing rollers 13 and 14 (or 13' and 14') whose special structure—identical for all four rollers—will be described with reference to the roller 14 of FIG. 4a, said roller being indicated in FIG. 4 by the arrow Z.

These rollers 13, 14, 13' and 14' are mounted on an undercarriage frame 15 to which further reference will be made later.

The roller 14 engages in the slot 12 and rotates on a stub shaft 14a fixed on a lug 18 on a tube 19a forming part of the undercarriage frame 15 an end washer 14b locks the roller against excess axial movement. A compression spring 17 bears on the bracket 18 and urges a rotary braking rim 16 against the inner face of the fixed side member 10. Thus, the roller 14 with its rim 16 frictionally engaging the inner face of the side member 10 will not roll in its slot unless the user effects the movement by displacing the seat-portion of the body by effort exerted to the front or to the rear by his hands or by his feet.

The undercarriage frame 15 with the seat body thereon moves therefore at the will of the user to one or other of the two extreme positions indicated in FIGS. 1 and 2, or to any intermediate position.

Hinges L pivotally connect the frame 15 to the moulded body 20 under the seat portion 20a thereof. This moulded body 20, preferably moulded as a sheet from hard plastics material, is hollowed to correspond to the general physical form of almost all users and consists of the seat portion 20a and a back portion 20b. This moulded body 20 whose design in itself ensures a satisfactory general distribution of pressures on the body of the person occupying the seat, is fitted with a lining of thin resilient cushioning material 21 (FIG. 4) say of foam-rubber or the like which completes the provision for adjustment to differences in individual bodily builds without involving excessive increase in bulk, weight and cost-price of the seat. However—and this is a surprising point—the comfort of the seat is greatly improved by the provision in the body of two cylindrical recesses at the location of the ischia of the occupant, each recess accommodating a stud 24 which is made of foam-rubber or equivalent resilient material, and forms an integral extension of the cushioning material 21. An alternative construction (FIGS. 4b and 4c) consists in replacing the studs by a one-piece ridge 21b of cushioning material located on the seat portion of the moulded body which is correspondingly troughed to accommodate the ridge, thereby furnishing the user with a seat as comfortable as the embodiment according to FIG. 4.

The moulded body 20, by virtue of the rollers in the slots 11, 12, 11' and 12', can therefore be displaced in a curve by a sliding movement which, if one compares for example FIG. 1 and FIG. 2, advances the seat portion 20a and causes the back portion 20b to descend, the body thereupon assuming a position which is perceptibly more inclined without encroaching to the rear, that is, without reducing the space available to the occupant of the seat immediately behind. Further, the forward and upward movement of the seat portion 20a, while slightly raising the lower parts of the legs of the occupant of the seat, does not extend the legs of the occupant in a forward direction, and the legs will remain at ease under the seat in front, that is, in the zone I mentioned above.

As has already been stated, the moulded body 20 can tilt forwardly in relation to the undercarriage frame 15 about the hinges L (FIG. 3). This forward tilting, effected manually, can facilitate the passage of a person standing upright between two seats located one behind the other. The forward tilting movement is limited by a pair of extensible links pivotally connected to the body 20 and frame 15, each link consisting of two hinged parts 25, 26, with a brake washer embodied in the hinge. This forward tilting movement of the body can, however, occur in the event of fierce deceleration of a vehicle; the head of the occupant of the seat behind, instead of colliding dangerously with a fixture, is carried against the back portion of the seat in front, which portion in tilting more or less fully forwards, constitutes a motion-absorbing device; it provides therefore, a factor of at least relative safety.

On the upper part of the back portion 20b of the moulded body 20 are bearings 27, 27a which permit sliding adjustment of the height (simultaneously with maintainance in adjusted position) of rods 28 which support, above the top of the back portion, a head-rest 29 (FIGS. 1, 2, 3 and 5) whose upper position 29' is shown in broken lines in FIG. 1 and whose internal structure is shown in FIG. 5. The head-rest consists of a U-section hollow pad 30 of resilient material and an eccentric rotary roller abutment 31 mounted within the pad and engaging the inner face thereof. The pad can be hardened or softened to a greater or less extent by the relative inflation produced by rotation of the abutment 31 which is controlled by a hand lever 32.

The seat fittings are completed by a small portable tray 33 which can be, selectively, stowed in the raised position against the rear face of the back portion 20b of the seat (FIG. 2), or lowered to a horizontal position (FIG. 1, full lines) for use by the occupant of the seat behind, or transferred to a horizontal position at the ends of the arm-rests 130 (position 33', FIG. 1, broken lines) for use by the occupant of the seat. This last position of the tray places it much nearer the user (for meals or for writing) than when it is mounted behind the back portion of the seat.

FIGS. 7, 7a, 7b and 7c show a first example of a detent mechanism which limits pivotal movement to 180° and tends to maintain the tray against movement from its adjusted positions, i.e., in-use and stowed-away positions; the tray 33 includes a transverse tubular rod 34 on each end of which pins 35 and 35a fix a shaft 36 which rotates in a hollow, rectangular-section bearing including end blocks 39, 40. Lugs 37 and 37a on the shaft 36 engage two rods 38 and 38a carried by the end blocks 39, 40, and serve to support the tray in the horizontal in-use position and to limit pivoting of the tray about the axis 00' to a forwardly tilted position as shown in FIG. 3. Maintenance of the tray in the in-use and stowed positions is ensured by two U-type leaf springs 41 and 42 hooked on to the rods 38 and 38a, limbs 41a and 42a of the spring forming spring detents which engage cooperating flats on the shaft 36 (FIG. 7b). FIG. 7c shows a pin 43 projecting from the bearing. The pins allow the tray to be fixed either on the rear ends of the side members 10 or the front ends of the arm-rests 130 by engaging selectively in corresponding holes in these parts. The pin 43 is screwed into the bearing 40 and terminates in a shank 43a which engages in a circular groove 44 in the shaft 36 and thereby locks the bearing on the shaft.

Another form of detent mechanism is shown in FIGS. 8, 8d and 8e, in this case a cam 45 has two indentations 45a and 45b into one or other of which a detent roller 46 is urged by a detent spring 47 mounted in the bearing. Support for the tray in use is insured by a nose 45c on the cam 45 abutting a stop 48 integral with the bearing.

Figure 9A:
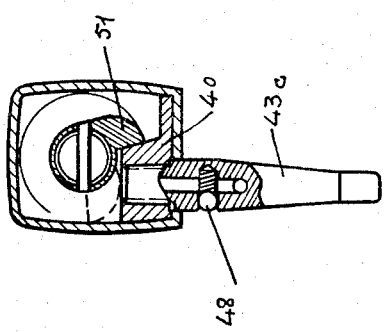
Figure 9:
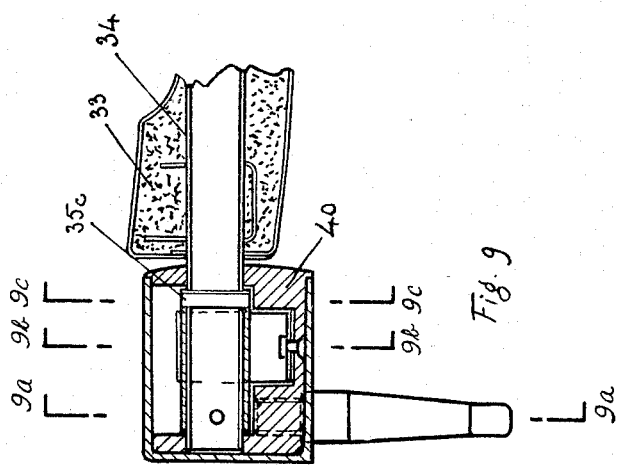
FIG. 9 is an axial section of a third form of tray mounting.
Figure 9C:
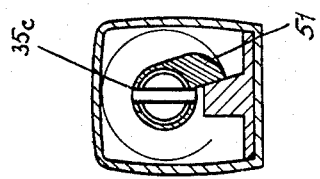

FIG. 9 shows in axial section yet another form of detent mechanism which appears in cross-section in FIGS. 9a, 9b and 9c; in this form, it will be noted in particular that each of the pins 43c by which the tray is fixed has a yielding ball 48 for co-operation with a corresponding recess in the opening to retain the pin in the opening. The bearing block 40 is engaged by a cam lug 51, and two leaf-springs 49 and 50 co-operate with flats on the shaft 36b.

I claim:

1. An adjustable seat comprising a body having a back portion and a seat portion, a support for the body including a pair of laterally spaced frames defining a front pair of laterally spaced guide slots sloping forwards and upwards and a rear pair of laterally spaced guide slots sloping forwards and downwards, front and rear pairs of laterally spaced bearing rollers mounted on the body under the seat portion thereof and engaging respectively in the front and rear pairs of guide slots to permit tilting adjustment of the body, the guide slots being so sloped that the upper extremity of the back portion of the body moves substantially vertically during tilting adjustment of the body, front and rear pairs of laterally spaced braking rings mounted on the body co-axially with the bearing rollers for limited axial sliding movement and presenting flat end faces adjacent to flat side faces on the frames of the support, and compression springs mounted on the body co-axially with the braking rings and urging the braking rings towards the frames so that said flat end and side faces frictionally interengage and the body is held in adjusted position under normal conditions of use while tilting adjustment of the body by the user is permitted.

2. An adjustable seat comprising a body having a back portion and a seat portion, a support for the body including a pair of spaced side frames defining a front pair of laterally spaced guide slots sloping forwards and upwards and a rear pair of laterally spaced guide slots sloping forwards and downwards, a carrier frame located under the seat portion and supporting the body, the seat portion being hingedly connected at its front end to the front end of the carrier frame so that the body is capable of forward hingeing movement to a stowed position, an extensible linkage connecting the seat portion with the carrier frame to limit said forward hingeing movement of the body, front and rear pairs of laterally spaced bearing rollers mounted on the carrier frame and engaging respectively in the front and rear pairs of guide slots of the side frames to permit tilting adjustment of the body, the guide slots being so sloped that the upper extremity of the back portion of the body moves substantially vertically during tilting adjustment of the body, braking means mounted on the carrier frame for movement towards and from the support, and spring means urging the braking means into frictional engagement with the support so that the braking means hold the body in adjusted position under normal conditions of use and permit tilting adjustment of the body by the user.

3. An adjustable seat as defined in claim 2, wherein the extensible linkage between the seat portion and the carrier frame consists of a pair of laterally spaced links pivotally connected at their ends to the seat portion an carrier frame, each link consisting of a pair of hingedly interconnected half-links having a brake washer embodied in the hinge.

References Cited by the Examiner

UNITED STATES PATENTS

| | | | |
|---|---|---|---|
| 593,686 | 11/1897 | Parsons | 188—83 |
| 1,234,267 | 7/1917 | Bennett | 297—335 |
| 1,292,646 | 1/1919 | Reynolds | 297—153 |
| 1,647,032 | 10/1927 | Birkigt | 188—83 |
| 2,100,170 | 11/1937 | Parks | 297—329 |
| 2,102,979 | 12/1937 | Smith | 297—318 |
| 2,153,763 | 4/1939 | Kuhler | 297—329 |
| 2,277,947 | 3/1942 | Bailey | 248—429 |
| 2,313,023 | 3/1943 | Ruegger | 297—329 |
| 2,549,902 | 4/1951 | Hibbard | 297—284 |
| 2,563,347 | 8/1951 | Long | 297—153 |
| 2,899,167 | 8/1959 | Elsner | 248—429 |
| 2,970,638 | 2/1961 | Halter | 297—458 |
| 3,027,194 | 3/1962 | Rumptz | 297—410 |
| 3,134,627 | 5/1964 | Mason | 297—416 |

FOREIGN PATENTS 509,033    10/1937    Great Britain.

FRANK B. SHERRY, *Primary Examiner.*

FRANCIS K. ZUGEL, *Examiner.*